UNITED STATES PATENT OFFICE.

HEINRICH THRON, OF FRANKFORT-ON-THE-MAIN, GERMANY, ASSIGNOR TO VEREINIGTE CHININFABRIKEN, ZIMMER & CO., GESELLSCHAFT MIT BESCHRÄNKTER HAFTUNG, OF SAME PLACE.

PROCESS OF MAKING QUININ CARBONIC ETHER.

SPECIFICATION forming part of Letters Patent No. 640,977, dated January 9, 1900.

Application filed November 28, 1899. Serial No. 738,571. (No specimens.)

*To all whom it may concern:*

Be it known that I, HEINRICH THRON, a subject of the Emperor of Germany, and a resident of Frankfort-on-the-Main, Germany, have invented certain new and useful Improvements in Pharmaceutical Products, of which the following is a specification.

This invention relates to certain improvements in the process protected by the United States Patent No. 585,068 of making quinin carbonic ether. According to this patent the said pharmaceutical products are made by acting upon the levogyrate alkaloids of the cinchona-bark with derivatives of the chlorocarbonic acid. Now I have found that in this process the said alkaloids can be replaced by their salts, which under circumstances are better obtainable than the alkaloids themselves. The method of procedure is to act on the alkaloidal salt, preferably in the anhydrous condition, with the particular derivative of chlorocarbonic acid either alone or dissolved in some suitable solvent.

*Example I. Preparation of the chlorocarbonic ether of quinin or chlorocarbonyl quinin.*—36.05 kilograms of anhydrous quinin hydrochlorid (two molecular proportions) are dissolved in two hundred kilograms of chloroform, and into the cooled solution there are passed 9.9 kilograms of phosgene, (one molecular proportion,) which also can be in excess. The reaction proceeds according to the equation

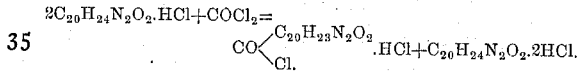

When the reaction is complete the mixture is allowed to stand for about twenty-four hours and freed from the acid quinin hydrochlorid by agitation with water, which decomposes at the same time the readily-decomposable hydrochlorid of quinin chlorocarbonic ether, the chloroform being then distilled off and the product recrystallized from alcohol. The chlorocarbonic ether of quinin obtained in this way has the properties described in the specification of the aforesaid patent.

*Example II. Preparation of quinin carbonic ethyl ether.*—36.05 kilograms of anhydrous quinin hydrochlorid (one molecular proportion) are suspended in one hundred and fifty kilograms of benzene and heated to boiling, while 10.85 kilograms of chloroformic ethyl ether (one molecular proportion) or even a small excess are allowed to flow slowly into the continuously-agitated liquid. The reaction proceeds according to the equation

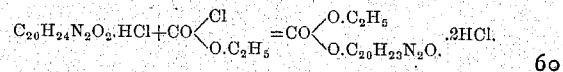

When the operation is complete, the benzene is distilled off, the residue dissolved in water, the quinin carbonic ethyl ether produced being precipitated by means of alkali and recrystallized from dilute alcohol, when a small quantity of quinin which has escaped the action of the chloroformic ether remains in the mother liquor. Obviously the product of reaction may be removed from the benzene solution by agitation with water or with dilute acid. Other anhydrous quinin salts—for example, 37.3 kilograms of anhydrous quinin sulfate—may be used in the place of quinin hydrochlorid. The quinin carbonic ethyl ether obtained in this way has the properties described in the specification of the aforesaid patent.

*Example III. Preparation of quinin carbonic benzyl ether.*—36.1 kilograms of anhydrous quinin hydrochlorid are suspended in one hundred and fifty kilograms of benzene and treated with 17.1 kilograms of chloroformic benzyl ether, added gradually to the boiling liquid. When the reaction is complete, the benzene is distilled off or the hydrochlorid quinin carbonic benzyl ether is extracted from it by agitation with water or a dilute acid. On adding an alkali the ether is set free and may be recrystallized from dilute alcohol.

Quinin carbonic benzyl ether crystallizes in slender white needles which melt at 110° centigrade and dissolve readily in alcohol, ether, benzene, or chloroform.

I claim—

1. The herein-described method of preparing pharmaceutical products by acting upon the salts of the alkaloids of the cinchona-bark with derivatives of the chlorocarbonic acid, substantially as and for the purpose set forth.

2. The herein-described method of preparing pharmaceutical products by acting upon the salts of the alkaloids of the cinchona-bark with an ether of chlorocarbonic acid, substantially as and for the purpose set forth.

In testimony whereof I have signed my name to this specification in the presence of two subscribing witnesses.

HEINRICH THRON.

Witnesses:
RICHARD GUENTHER,
CARL GRUND.